United States Patent
Dogan

(10) Patent No.: US 6,931,030 B1
(45) Date of Patent: Aug. 16, 2005

(54) TRAINING SEQUENCE WITH A RANDOM DELAY FOR A RADIO COMMUNICATIONS SYSTEM

(75) Inventor: Mithat C. Dogan, Sunnyvale, CA (US)

(73) Assignee: ArrayComm, Inc., San Jose, CA (US)

( * ) Notice: Subject to any disclaimer, the term of this patent is extended or adjusted under 35 U.S.C. 154(b) by 773 days.

(21) Appl. No.: 09/727,262

(22) Filed: Nov. 30, 2000

(51) Int. Cl.⁷ .................................................. H04J 3/06
(52) U.S. Cl. ........................ 370/509; 370/330; 370/278
(58) Field of Search ..................... 370/509, 503, 370/329, 330, 278, 318, 328, 442, 912, 913, 498; 375/342, 343; 342/174; 455/276.1, 67.4, 13.2; 709/400

(56) References Cited

U.S. PATENT DOCUMENTS

| | | | | |
|---|---|---|---|---|
| 4,414,661 A | * | 11/1983 | Karlstrom | 370/332 |
| 5,404,376 A | * | 4/1995 | Dent | 375/138 |
| 5,519,710 A | * | 5/1996 | Otsuka | 370/337 |
| 5,544,196 A | * | 8/1996 | Tiedemann et al. | 375/145 |
| 5,663,958 A | * | 9/1997 | Ward | 370/347 |
| 5,870,443 A | * | 2/1999 | Rahnema | 375/355 |
| 5,930,243 A | | 7/1999 | Parish et al. | 370/334 |
| 6,480,558 B1 | * | 11/2002 | Ottosson et al. | 375/350 |
| 6,535,736 B1 | * | 3/2003 | Balogh et al. | 455/434 |
| 6,650,714 B2 | * | 11/2003 | Dogan et al. | 375/343 |
| 6,674,817 B1 | * | 1/2004 | Dolle et al. | 375/342 |
| 2003/0067901 A1 | * | 4/2003 | Schein et al. | |

* cited by examiner

Primary Examiner—John Pezzlo
(74) Attorney, Agent, or Firm—Blakely, Sokoloff, Taylor & Zafman LLP

(57) ABSTRACT

A method and apparatus are provided that allows a delay to be chosen to be applied to a user terminal. According to one aspect of the present invention, the invention includes receiving a downlink broadcast burst from a base station, determining timing for an uplink burst from the received broadcast burst, selecting an amount of delay for the uplink burst, and transmitting an uplink burst to the base station using the determined timing and the selected amount of delay.

22 Claims, 7 Drawing Sheets

TRAINING SEQUENCE WITH A RANDOM DELAY FOR A RADIO COMMUNICATIONS SYSTEM

BACKGROUND OF THE INVENTION

1. Field of the Invention

The present invention applies to burst timing for radio communications systems and, in particular, to selecting from among different amounts of delay for use in sending a burst from one station to another.

2. Description of the Prior Art

Mobile radio communications systems such as cellular voice and data radio systems typically have several base stations in different locations available for use by mobile or fixed user terminals, such as cellular telephones or wireless web devices. Each base station typically is assigned a set of frequencies or channels to use for communications with the user terminals. The channels are different from those of neighboring base stations in order to avoid interference between neighboring base stations. As a result, the user terminals can easily distinguish the transmissions received from one base station from the signals received from another. In addition, each base station can act independently in allocating and using the channel resources assigned to it.

Such radio communications systems typically include a broadcast channel (BCH). The BCH is broadcast to all user terminals whether they are registered on the network or not and informs the user terminals about the network. In order to access the network, a user terminal normally tunes to and listens to the BCH before accessing the network. It will then use the information in the BCH to request access to the network. Such a request typically results in an exchange of information about the network using separate control and access channels and ends in the user terminal receiving an assignment to a particular base station.

Before the user terminal has received an assignment, its request for access is typically sent in a timeslot that is shared with other user terminals. This allows for the possibility that its request will collide with other requests. If the request is received at the same time as the colliding request, it can be difficult to resolve the colliding requests at the base station. However, accurate delay timing advance or delay assignments cannot be made by the base station until the range to each of the user terminals is known. In addition, the BCH does not permit assignments to be made as it is the same for all user terminals that receive it.

BRIEF SUMMARY OF THE INVENTION

A method and apparatus are provided that allows a delay to be chosen to be applied to a user terminal. According to one aspect of the present invention, the invention includes receiving a downlink broadcast burst from a base station, determining timing for an uplink burst from the received broadcast burst, selecting an amount of delay for the uplink burst, and transmitting an uplink burst to the base station using the determined timing and the selected amount of delay.

BRIEF DESCRIPTION OF THE DRAWINGS

The present invention is illustrated by way of example, and not by way of limitation, in the figures of the accompanying drawings in which like reference numerals refer to similar elements and in which.

DETAILED DESCRIPTION OF THE INVENTION

Base Station Structure

Figure 1:
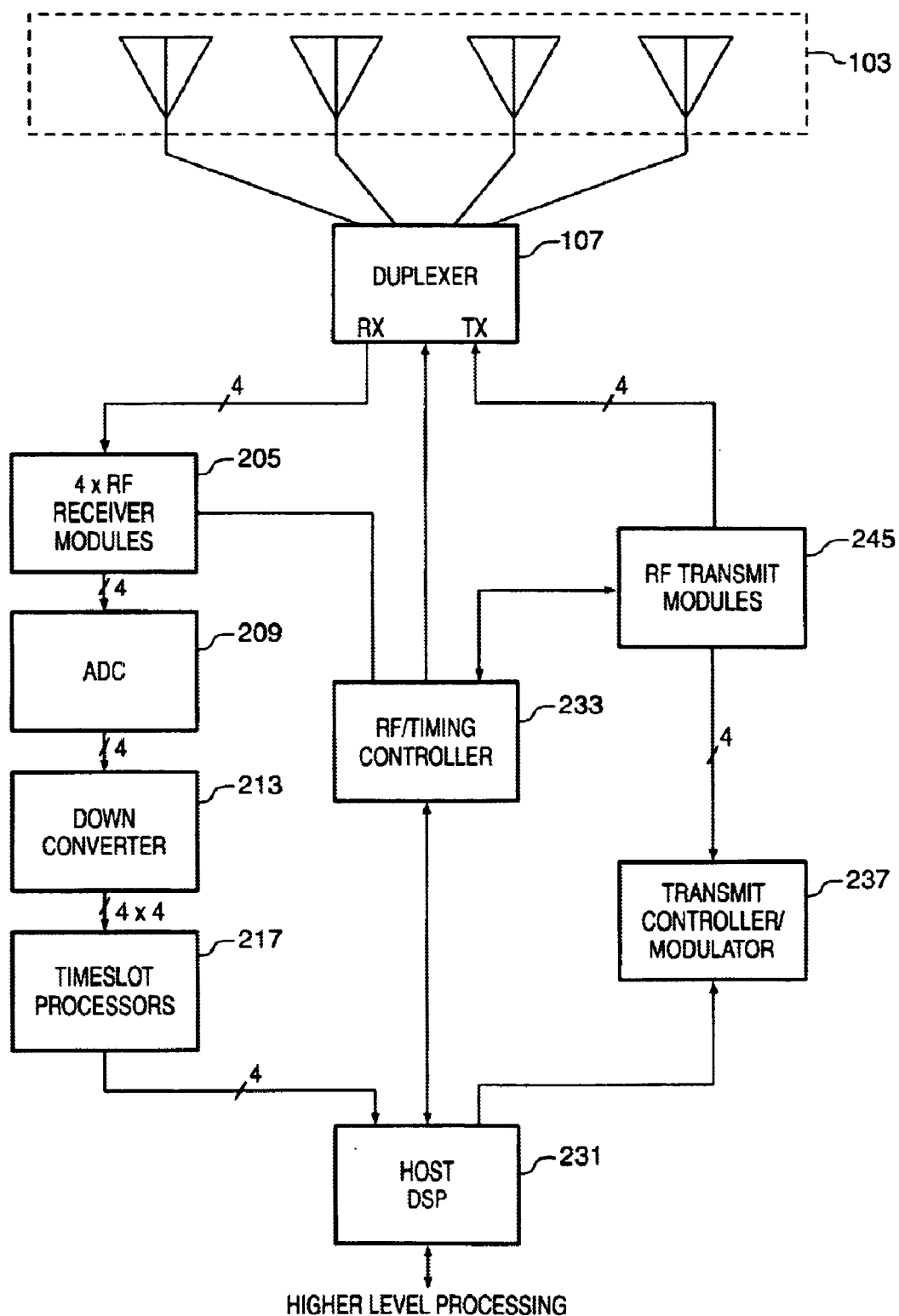
FIG. 1 is a simplified block diagram of a base station on which an embodiment of the invention can be implemented.

The present invention relates to wireless communication systems and may be a fixed-access or mobile-access wireless network using spatial division multiple access (SDMA) technology in combination with multiple access systems, such as time division multiple access (TDMA), frequency division multiple access (FDMA) and code division multiple access (CDMA). Multiple access can be combined with frequency division duplexing (FDD) or time division duplexing (TDD). FIG. 1 shows an example of a base station of a wireless communications system or network suitable for implementing the present invention. The system or network includes a number of subscriber stations, also referred to as remote terminals or user terminals, such as that shown in FIG. 2. The base station may be connected to a wide area network (WAN) through its host DSP 231 for providing any required data services and connections external to the immediate wireless system. To support spatial diversity, a plurality of antennas 103 is used, for example four antennas, although other numbers of antennas may be selected.

A set of spatial multiplexing weights for each subscriber station are applied to the respective modulated signals to produce spatially multiplexed signals to be transmitted by the bank of four antennas. The host DSP 231 produces and maintains spatial signatures for each subscriber station for each conventional channel and calculates spatial multiplexing and demultiplexing weights using received signal measurements. In this manner, the signals from the current active subscriber stations, some of which may be active on the same conventional channel, are separated and interference and noise suppressed. When communicating from the base station to the subscriber stations, an optimized multi-lobe antenna radiation pattern tailored to the current active subscriber station connections and interference situation is created. Suitable smart antenna technologies for achieving such a spatially directed beam are described, for example, in U.S. Pat. No. 5,828,658, issued Oct. 27, 1998 to Ottersten et al. and U.S. Pat. No. 5,642,353, issued Jun. 24, 1997 to Roy, III et al.

The outputs of the antennas are connected to a duplexer switch 107, which in this TDD system is a time switch. Two possible implementations of switch 107 are as a frequency duplexer in a frequency division duplex (FDD) system, and as a time switch in a time division duplex (TDD) system. When receiving, the antenna outputs are connected via switch 107 to a receiver 205, and are mixed down in analog by RF receiver ("RX") modules 205 from the carrier frequency to an FM intermediate frequency ("IF"). This signal then is digitized (sampled) by analog to digital converters ("ADCs") 209. Only the real part of the signal is sampled. Final down-converting to baseband is carried out digitally. Digital filters can be used to implement the down-converting and the digital filtering, the latter using finite impulse response (FIR) filtering techniques. This is shown as block 213. The invention can be adapted to suit a wide variety of RF and IF carrier frequencies and bands.

There are, in the present example, four down-converted outputs from each antenna's digital filter device 213, one per receive timeslot. The particular number of timeslots can be varied to suit network needs. While the present example uses four uplink and four downlink timeslots for each TDD frame, desirable results have also been achieved with three timeslots for the uplink and downlink in each frame. For each of the four receive timeslots, the four down-converted outputs from the four antennas are fed to a digital signal processor (DSP) device 217 (hereinafter "timeslot processor") for further processing, including calibration, according to one aspect of this invention. Four Motorola DSP56303 DSPs can be used as timeslot processors, one per receive timeslot. The timeslot processors 217 monitor the received signal power and estimate the frequency offset and time alignment. They also determine smart antenna weights for each antenna element. These are used in the spatial diversity multiple access scheme to determine a signal from a particular remote user and to demodulate the determined signal.

The output of the timeslot processors 217 is demodulated burst data for each of the four receive timeslots. This data is sent to the host DSP processor 231 whose main function is to control all elements of the system and interface with the higher level processing, which is the processing which deals with what signals are required for communications in all the different control and service communication channels defined in the system's communication protocol. The host DSP 231 can be a Motorola DSP56303. In addition, timeslot processors send the determined receive weights for each user terminal to the host DSP 231. The host DSP 231 maintains state and timing information, receives uplink burst data from the timeslot processors 217, and programs the timeslot processors 217. In addition it decrypts, descrambles, checks error correcting code, and deconstructs bursts of the uplink signals, then formats the uplink signals to be sent for higher level processing in other parts of the base station. With respect to the other parts of the base station it formats service data and traffic data for further higher processing in the base station, receives downlink messages and traffic data from the other parts of the base station, processes the downlink bursts and formats and sends the downlink bursts to a transmit controller/modulator, shown as 237. The host DSP also manages programming of other components of the base station including the transmit controller/modulator 237 and the RF timing controller shown as 233.

The RF timing controller 233 interfaces with the RF system, shown as block 245 and also produces a number of timing signals that are used by both the RF system and the modem. The RF controller 233 reads and transmits power monitoring and control values, controls the duplexer 107 and receives timing parameters and other settings for each burst from the host DSP 231.

The transmit controller/modulator 237, receives transmit data from the host DSP 231, four symbols at a time. The transmit controller uses this data to produce analog IF outputs which are sent to the RF transmitter (TX) modules 245. Specifically, the received data bits are converted into a complex modulated signal, up-converted to an IF frequency, 4-times over-sampled, multiplied by transmit weights obtained from host DSP 231, and converted via digital to analog converters ("DACs") which are part of transmit controller/modulator 237 to analog transmit waveforms. The analog waveforms are sent to the transmit modules 245.

The transmit modules 245 up-convert the signals to the transmission frequency and amplify the signals. The amplified transmission signal outputs are sent to antennas 103 via the duplexer/time switch 107.

User Terminal Structure

Figure 2:
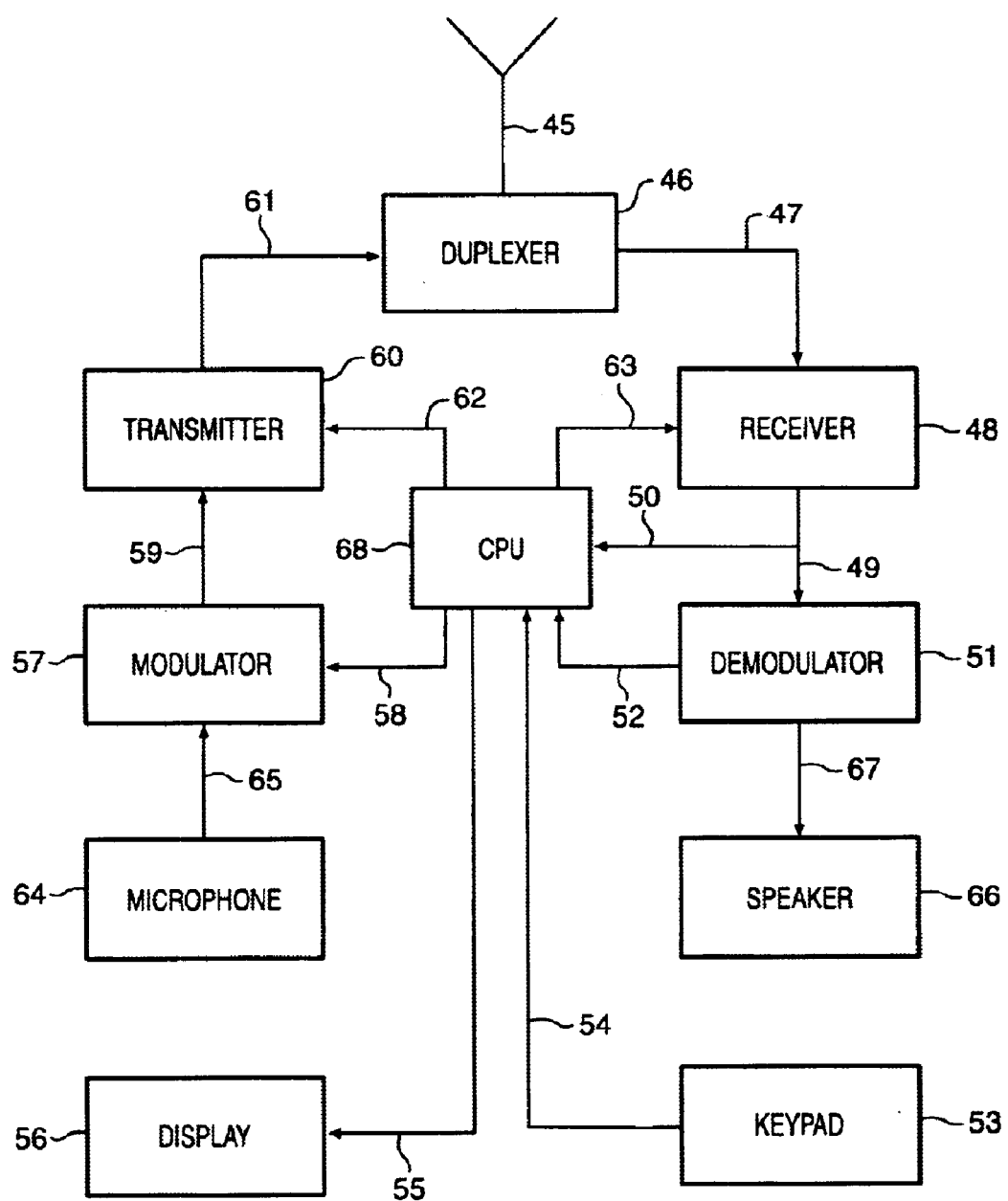
FIG. 2 is a block diagram of a remote terminal on which an embodiment of the invention can be implemented.

FIG. 2 depicts an example component arrangement in a remote terminal that provides data or voice communication. The remote terminal's antenna 45 is connected to a duplexer 46 to permit antenna 45 to be used for both transmission and reception. The antenna can be omni-directional or directional. For optimal performance, the antenna can be made up of multiple elements and employ spatial processing as discussed above for the base station. In an alternate embodiment, separate receive and transmit antennas are used eliminating the need for the duplexer 46. In another alternate embodiment, where time division diversity is used, a transmit/receive (TR) switch can be used instead of a duplexer as is well-known in the art. The duplexer output 47 serves as input to a receiver 48. The receiver 48 produces a down-converted signal 49 which is the input to a demodulator 51. A demodulated received sound or voice signal 67 is input to a speaker 66.

The remote terminal has a corresponding transmit chain in which data or voice to be transmitted is modulated in a modulator 57. The modulated signal to be transmitted 59, output by the modulator 57, is unconverted and amplified by a transmitter 60, producing a transmitter output signal 61. The transmitter output 61 is then input to the duplexer 46 for transmission by the antenna 45.

The demodulated received data 52 is supplied to a remote terminal central processing unit 68 (CPU) as is received data before demodulation 50. The remote terminal CPU 68 can be implemented with a standard DSP (digital signal processor) device such as a Motorola series 56300 DSP. This DSP can also perform the functions of the demodulator 51 and the modulator 57. The remote terminal CPU 68 controls the receiver through line 63, the transmitter through line 62, the demodulator through line 52 and the modulator through line 58. It also communicates with a keyboard 53 through line 54 and a display 56 through line 55. A microphone 64 and speaker 66 are connected through the modulator 57 and the demodulator 51 through lines 65 and 66, respectively for a voice communications remote terminal. In another embodiment, the microphone and speaker are also in direct communication with the CPU to provide voice or data communications.

The remote terminal's voice signal to be transmitted 65 from the microphone 64 is input to a modulator 57. Traffic and control data to be transmitted 58 is supplied by the remote terminal's CPU 68. Control data 58 is transmitted to base stations during registration, session initiation and termination as well as during the session as described in greater detail below.

In an alternate embodiment, the speaker 66, and the microphone 64 are replaced or augmented by digital interfaces well-known in the art that allow data to be transmitted to and from an external data processing device (for example, a computer). In one embodiment, the remote terminal's CPU is coupled to a standard digital interface such as a PCMCIA interface to an external computer and the display, keyboard, microphone and speaker are a part of the external computer.

The remote terminal's CPU 68 communicates with these components through the digital interface and the external computer's controller. For data only communications, the microphone and speaker can be deleted. For voice only communications, the keyboard and display can be deleted.

Broadcast Channel (BCH)

Figure 3:
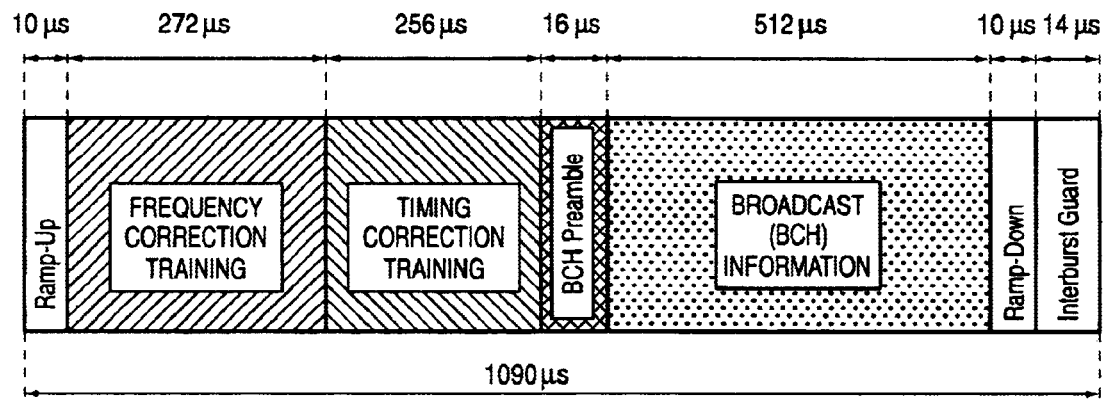
FIG. 3 is a diagram of an exemplary broadcast channel BCH burst.

In one embodiment, the system of the present invention is initiated for each user terminal or remote terminal from the broadcast channel BCH which is transmitted as a burst from the base station to all potential user terminals. The BCH burst, unlike the traffic channel bursts, is transmitted in all directions where user terminals may be, typically omnidirectionally but the specific beam pattern will depend on the network. An example of a broadcast burst structure is shown in FIG. 3. The BCH communicates enough basic information to enable a subsequent exchange of configuration request CR and configuration message CM between the base station and the user terminal. The BCH also provides general frequency offset and timing update information to all user terminals.

Table 1, below summarizes the content of an example of a BCH burst, as shown in FIG. 3.

TABLE 1

| Duration | Contents |
|---|---|
| 10 μsec | ramp - up |
| 272 μsec | frequency correction training symbols $f_1, f_2, \ldots, f_{136}$ |
| 256 μsec | timing correction training symbols $t_1, t_2, \ldots t_{128}$ |
| 16 μsec | broadcast preamble $r_1, r_2, \ldots r_8$ |
| 512 μsec | information symbols $h'_1, h'_2, \ldots h'_{256}$ |
| 10 μsec | ramp - down |
| 14 μsec | inter-burst guard time |

The frequency and timing correction training symbols can be set according to any one of many approaches well-known in the art. They can also be combined, exchanged with a synchronization sequence or eliminated.

The broadcast information symbols are constructed from a 15-bit broadcast message which is modulated and coded into a 256 bit sequence. The number of symbols as well as the structure and sequence of transmitted bits can be varied to suit a wide variety of applications. The broadcast channel information symbols provide the information needed for a user terminal to request a configuration message from the base station.

Each broadcast message is mapped into a broadcast burst with the information shown below in Table 2.

TABLE 2

| Broadcast Message | |
|---|---|
| Field | # of Bits |
| BStxPwr | 5 |
| BSCC | 7 |
| BSload | 3 |
| Total | 15 |

BStxPwr is the effective isotropic radiated power of the broadcast message. This number indicates the power transmitted by the base station taking into account the number of amplifiers and diversity antennas available at the base station.

BSCC is the base station color code, used by the user terminal to select training data for uplink bursts and to distinguish broadcasts of different base stations.

BSload is an indication of the amount of unused capacity the base station has.

In one embodiment, the network is designed to take maximal advantage of spatial division multiple access technologies and particularly smart antenna array signal processing. To help maintain reliable spatial channels in an extremely dense frequency reuse pattern, the network uses time division duplex TDMA where uplink and downlink transmissions are always on the same frequency. In addition, because many user terminals are single antenna and transmit and receive omnidirectionally, except for the BCH, an uplink burst is always received before a downlink burst needs to be sent. This allows downlink bursts to be more accurately spatially directed. An uplink training sequence is embedded in every uplink burst to allow for, moderately fast frequency hopping despite any decorrelation of the spatial channel with frequency.

The frequency hopping sequence may be any one of many different sequences well-known in the art. In one embodiment, the parameters of the frequency hopping scheme are initially unknown to the user terminal. This maximizes the flexibility of the network and increases the flexibility of the user terminal. As explained below, the frequency hopping parameters are transmitted to the user in the CM burst.

In one embodiment, the BCH channel is shared by all base stations in the wireless communication system. Using the 7 bit BSCC, up to 128 base stations can be accommodated. The BCH is part of a time division duplex channel with a repeating frame. The channel that includes BCH is a single RF carrier frequency used for uplink and downlink. For high noise environments or for increased robustness, the BCH can hop frequencies according to a predetermined scheme or be repeated on several different frequencies. The repeating frame includes the downlink BCH for each base station, labeled BS1 etc. as shown in Table 3 below. The next frame includes the uplink Configuration Request CR, labeled CR1 etc. and downlink Configuration Message CM, labeled CM1 etc. Each frame also includes a number of reserved slots, shown as empty boxes below. These slots can be used for data traffic, if the broadcast channel is also used for traffic, for other control messages or reserved to reduce interference on other channels in the network. In one embodiment, the other traffic channels hop frequencies around and through the BCH. The frames are repeated for each respective base station 1 to 128 to build a superframe as discussed in more detail below. After the last CM, CM128, the superframe repeats and begins again with the next superframe and the BCH for base station 1.

TABLE 3

| | | Uplink | Downlink |
|---|---|---|---|
| Superframe 1 | Frame 1 | | BS1 |
| | Frame 2 | CR1 | CM1 |
| | Frame 3 | | BS2 |
| | Frame 4 | CR2 | CM2 |
| | ... | ... | ... |
| | Frame 255 | | BS128 |
| | Frame 256 | CR128 | CM128 |
| Superframe 2 | Frame 1 | | BS1 |
| | Frame 2 | CR1 | CM1 |
| | ... | ... | ... |

In another embodiment, the BCH is on its own channel and CR and CM are on a separate control channel. Alternately, one BCH can be provided on a constant frequency and a secondary BCH can be provided on another channel with hopping frequency. The hopping channel is described in the CM.

Registration

In one embodiment of the present invention, a session begins when a user terminal seeks to register with a base station. The user terminal does this without knowing its relative position to the best station in terms of direction and distance (or range) to the base station (BS). Therefore, when the user terminal (UT or remote terminal or subscriber station) requests registration using a configuration request (CR) burst, the base station receives the transmission from the user terminal with a large timing uncertainty and unknown spatial parameters or weights when compared to traffic bursts that already utilize timing advance directives from the base station.

Before registration, several user terminals may transmit CR bursts during the same time slot to register with the same, base station. CR bursts addressed to different base stations may also be received. The base station resolves these requests using spatial processing and multiple antennas. By combining the multiple antenna measurements (beamforming) the base station minimizes the interference between signals and maximizes the signal-to-noise ratio (SNR) of each received burst.

Beamforming can be performed in a variety of ways. In one embodiment, a training sequence is used with a least-squares cost function to determine the weights for a beamformer. This allows signals to be classified as desired or undesired. The training sequence-based approach uses an estimation of the timing and frequency offset of the CR burst. This estimation task can be performed by determining the least-squares cost for each timing and frequency hypothesis. This demands great computational resources. Using a special sequence design and a beamforming algorithm that does not require a search over the entire timing uncertainty range alleviates the computational load of the full search. In one embodiment, since CR bursts have a high timing inaccuracy, a periodic training sequence is dedicated for CR bursts alone.

Configuration Request Burst Structure

A configuration request (CR) burst is transmitted by a user terminal (user terminal) in order to initiate communications or registration with a base station (base station). It is transmitted after gathering information about the system by listening to (multiple) broadcast channel (BCH) bursts. The CR burst, is the first communication from a user terminal to the base station and therefore, the user terminal does not have any information about its range to its selected base station. Accordingly timing, range, and spatial processing weights among other things are all unknown to the base station. An example of a CR burst is shown in FIG. 4.

Figure 4:
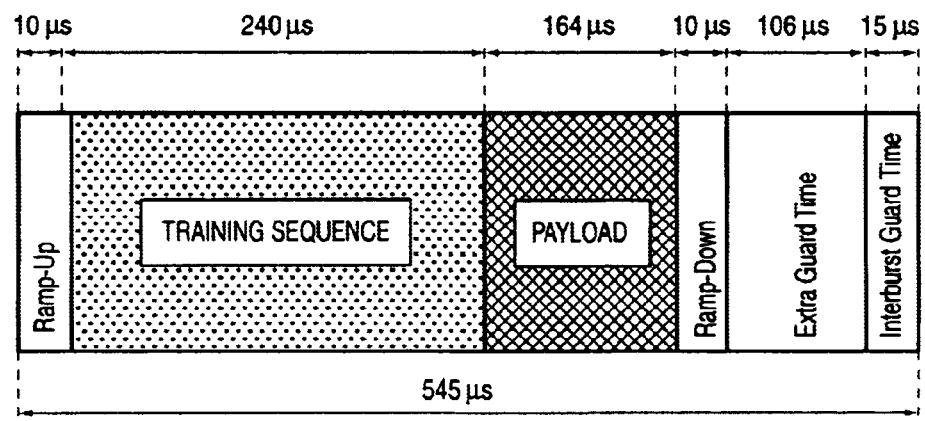
FIG. 4 is a diagram of an exemplary configuration request CR burst.

The configuration request burst is composed of several fields as shown in FIG. 4 which are listed in Table 4. The durations are described in terms of microseconds. In one embodiment, a symbol period is 2 microseconds.

TABLE 4

Configuration Request (CR) Burst fields

| Duration | Contents |
| --- | --- |
| 10 μsec | ramp - up |
| 240 μsec | training symbols |
| 164 μsec | information symbols |
| 10 μsec | ramp - down |
| 106 μsec | extra guard time |
| 15 μsec | inter-burst guard time |

The training symbols are allocated 240 microseconds in order to allow the signal to be accurately received and demodulated before a user terminal has registered and has received any knowledge of the system. The training symbols are discussed in more detail below.

The 82 information symbols are constructed from the configuration request message using, for example, forward error correction coding. In the present embodiment, the CR burst is modulated using $\pi/2$-BPSK modulation in order to decrease the peak-to-average ratio of the transmitted waveform.

The information symbols of the present CR burst are mapped out as shown in Table 5, below. Any of the items listed below can be deleted and transmitted later during the registration cycle or not at all based on the needs of the system. CR is scrambled by a function of BSCC ensuring that even if there is some interference from CRs sent to nearby base stations, the demodulation capture effect of the BSCC works out any collisions. In one embodiment, the scrambling is performed by taking the encoded bit sequence and exclusive OR'ing it with the output of a linear feedback shift register.

TABLE 5

Configuration Request Message

| Field | # of Bits |
| --- | --- |
| identity | 8 |
| utClass | 4 |
| txPwr | 5 |
| Total | 17 | identity is a set of unique random bits for each user terminal that differentiate simultaneous messages from multiple user terminals. Because of the randomness and large number of bits, it is unlikely that two user terminals will select the same identity code at the same time.

utClass identifies user terminal capabilities (highest modulation class, frequency hopping capabilities, etc.) This sequence identifies the type of user terminal that sent the CR. A palmtop digital assistant might have different capabilities than a desktop computer with a fixed dedicated antenna. With utClass, the different capabilities can be distinguished.

txPwr represents the power used by the user terminal to transmit the Configuration Request burst. For example, user terminal power=(2·txPwr−30) dBm.

In the present embodiment, the CR burst includes 106 microseconds of extra guard time. As mentioned above, the CR burst is transmitted by a user terminal without any knowledge of the time required for the burst to travel to the base station. In the present embodiment, the desired maximum range from a user terminal to a base station is 15 km. The delay of the burst's reception at the base station includes the delay in receiving the BCH from the base station. A user terminal at range R km receives the BCH burst(s) R/c seconds after they are transmitted by the base station (c=3× $10^8$ m/sec). When the user terminal decides to transmit a CR burst, its signal will be delayed by another R/c seconds, so that the delay of the CR burst at the base station relative to base station time will be 2R/c seconds. To accommodate delays created by a maximum range of 15 km, the guard period at the end of the CR burst time slot should be at least 100 microseconds. In addition, in the present embodiment, the user terminal randomly delays its CR burst transmission from 0 to 9 symbols in order to reduce collisions with other user terminals that are sending CR bursts in the same slot and that may be at about the same range from the base station. Therefore, a CR burst from a distant user terminal may arrive at the base station as much as 118 microseconds late as compared to a user terminal that is very close to the base station and that does not delay its CR burst transmission. This accounts for the 106 microseconds of extra guard time that is allotted to the CR burst and the extra margin supplied by the 15 microseconds of inter-burst guard time. With the inter-burst guard time 3 microseconds of extra margin are allotted before the beginning of the next slot.

The present embodiment also includes an additional 15 microseconds of interburst guard time. This helps to confine the RF energy from the CR burst to the time-slot allocated for the CR burst in order not to create adjacent slot interference. The interburst guard time provides a total guard time of 121 microseconds to reduce the likelihood that a CR burst will extend into the next time slot.

The CR burst is sent on the control carrier, as an example, exactly 2265 μsec after receipt of a downlink BCH burst. In this way, an otherwise uninitialized user terminal can send CR without any knowledge of the frequency hopping sequence parameters. As discussed above, the CR burst is shorter than a standard uplink time-slot to allow for unknown time-of-flight from the user terminal to the base station and typically arrives late in the uplink time-slot receive window.

Training Sequences

In the present embodiment, known periodic training sequences are used for the training of base station beamformers in order to extract the desired CR bursts in the presence of interference. The training sequence includes several periodic repetitions of a core sequence followed by a marker sequence. Alternatively, the marker sequence may precede the repetition of the core sequence. By repeating the core sequence, the search range for a least squares (LS) beamformer can be reduced to a single repetition period of the training sequence. The period of the core sequence is a compromise between the duration of the search range and the possibility of finding sequences of the specified period with good autocorrelation and cross correlation properties. In the present embodiment, constraints on the periodicity, mean, autocorrelation and cross correlation are used to define the core sequences of the training sequence for CR burst acquisition.

Periodicity: $x(k+P)=x(k)$, in which $x(k)$ is the periodic part of a $\pi/2$-BPSK training sequence and P is the period of the sequence. In the present example, P=12 symbols.

Mean: the mean of the periodic sequence is constrained to be zero:

$$\frac{1}{P}\sum_{k=1}^{P} x(k) = 0.$$

Autocorrelation: The out-of phase (symbol spaced) autocorrelation is bounded by 1/3, where τ is the phase offset of the out-of-phase sequence:

$$\frac{\left|\sum_{k=1}^{P} x*(k)x(k+\tau)\right|}{\sum_{k=1}^{P} |x(k)|^2} \leq 1/3, \quad \tau \neq 0$$

Cross correlation: Symbol spaced cross correlation between two candidate periodic sequences $x(k)$ and $y(k)$ is bounded by 1/3:

$$\frac{\left|\sum_{k=1}^{P} x*(k)y(k+\tau)\right|}{\sqrt{\sum_{k=1}^{P} |x(k)|^2} \sqrt{\sum_{k=1}^{P} |y(k)|^2}} \leq 1/3$$

At least two $\pi/2$-BPSK sequences conform to these constraints. More sequences may be possible if the constraints are relaxed. These two sequences are used as the core 12 symbol sequence that is repeated to form the periodic training sequence as discussed below. They are:

$s_1=[1,j,1,j,1,-j,-1,j,-1,-j,-1,-j]$
$s_2=[1,j,1,-j,-1,-j,1,j,-1,-j,-1,j]$

The bounds on auto and cross correlations help to make delayed versions of these sequences to appear partially uncorrelated to an LS beamformer which resolves them.

The two periodic sequences can be shared among base stations. In one embodiment, depending on its color code, a base station will accept one of the two core training sequences but not both. The user terminal will be able to transmit the correct accepted sequence after learning the base station color code from the broadcast (BCH) burst. This enables a reuse pattern of 2. For reuse patterns greater than 2, some of the constraints on the sequences can be relaxed to yield a larger set of possible periodic sequences to distribute among the base stations.

In an alternate embodiment, the user terminal selects which of the core sequences it will transmit. This can aid a base station in resolving two interfering CR bursts. The core sequence can be selected based on a serial number, product number, ID number or other stored number of the user terminal. For, example if the two sequences $s_1$ and $s_2$ above are available, the user terminal can read its serial number register. If the serial number is odd it selects sequence $s_1$ and if the serial number is even it selects $s_2$. In another embodiment, the user terminal can generate a random number from 1 to 2. If there are more than two sequences a greater range of random numbers can be generated. The random number is then mapped into a list of sequences in order to select the periodic sequence that is associated with the generated random number.

Transmitting CR Burst and Random Delay

In one embodiment, the base station transmits broadcast channel (BCH) bursts continuously over a pre-established known channel. To begin a session with a desired base station, an unregistered and unrecognized user terminal in an unknown location listens to the BCH bursts. From the BCH, it determines the base station with which wants to establish communications and selects an appropriate training sequence for that base station. It also selects a random number D between 0 and 9, and transmits its CR burst after delaying it for D symbols. The number for the delay can be selected as described above with respect to the periodic training sequence. The user terminal can select an internal register such as a Serial No. or Product ID No., that contains a number greater than 9 and use this as a pointer to select the number D. Alternatively, the user terminal can use a random number generator to generate a random number between 0 and 9 and apply this number to select D.

In one embodiment, the maximum value of random delay D is 9 symbols. Therefore, a user terminal can pick one of the 10 random delays, {0,1,2, . . . ,9} to send its CR burst to the base station. In addition, the maximum allowable roundtrip delay from the base station to the user terminal is assumed to be 50 symbols. Therefore, a CR burst can be delayed as much as 59 symbols for a user terminal at the maximum possible range. This delay is measured with respect to the CR burst of a user terminal that is at zero range and that did not delay its transmission.

The base station receives and resolves the CR burst as described below. The roundtrip delay is determined to be $2(R/c)+D$ microseconds (since a symbol period is 2 microseconds where R km is the range of the user terminal. The base station, in the Configuration Message (CM) burst, then instructs the user terminal to advance its time by $\tau_a=(R/c+D/2)$ microseconds in its response to the CR burst. The base station is unaware of what, if any delay D the user terminal has applied to its CR burst. In response to this instruction, the user terminal, knowing its random delay D will subtract out the random delay from the propagation delay and advance its timing by $\tau_a-(D/2)$ microseconds.

The random delay of D symbols is particularly valuable in a microcellular setting, or when user terminals cluster at about the same range from the base station. If the range is about the same for two different user terminals, the CR bursts from the two user terminals will look identical at the base station and may not be resolved. With random delays, the CR bursts will be spaced apart making them easier to distinguish.

CR Burst Resolution

Figure 5:
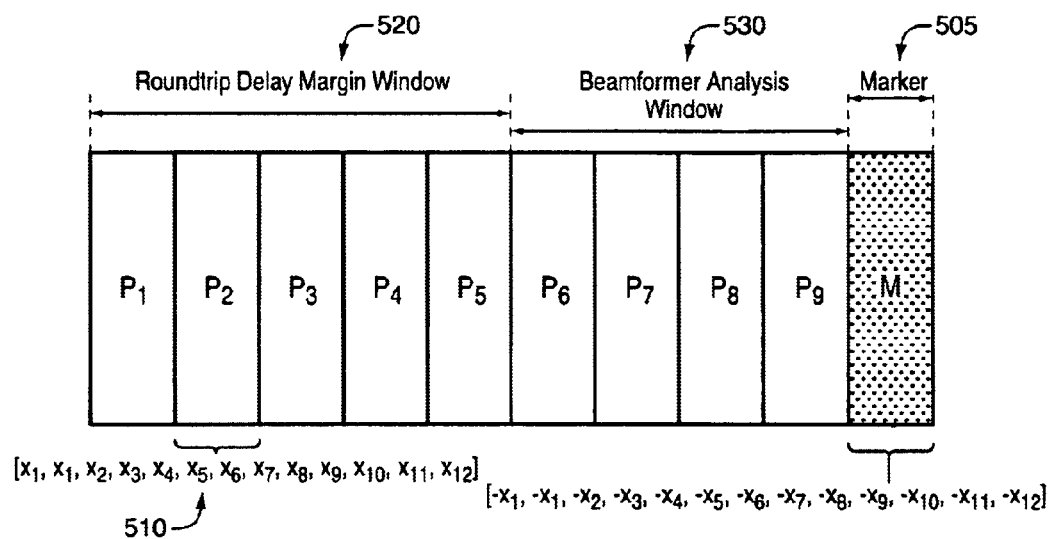
FIG. 5 is a diagram of an exemplary training sequence in accordance with the present invention.

FIG. 5 shows a training sequence of a CR burst for one embodiment of the invention. In FIG. 5, x 510 is one of the two core sequences $\{s_1, s_2\}$. x is the vector consisting of 12 symbols $x_1$ to $x_{12}$. In this application, boldface text is used to represent vectors and normal text is used to represent scalars. The complete CR Burst training sequence is constructed from the core periodic sequence x. Nine repetitions of x; P1,P2, . . . , P9 are followed by a marker sequence M 505. FIG. 5 also can be viewed from the perspective of base station timing. In one embodiment, FIG. 5 shows windows that the base station uses to resolve received training sequences in a CR burst. In this context, the sequences P1 to M would line up with the windows as shown only if the sequences were received from a user terminal that was in the same location as the base station, or in other words, if there were no propagation delay between the base station and the user terminal. In this paradigm, a round trip delay margin window 520 contains the sequences P1 through P5 for a total of 60 symbols or 120 microseconds. This accommodates a combined delay of 50 symbols due to the round trip propagation delay between the user terminal and the base station and 10 symbols of user terminal selected random delay. A beamformer analysis window 530 contains core sequences P6 through P9 and so is 48 symbols wide. This window will capture 4 periods of x even if the CR burst is delayed by up to 60 symbols.

Using the observations that fall into the beamformer analysis window, a base station can estimate the delay encountered by the CR burst modulo-12 symbols since each period P1 through P9 is identical and 12 symbols long. In other words, the measurement in the beamformer analysis window will be the same for the delays $\tau$ and $\tau+12$, where $0 \leq \tau < 12$. The marker sequence M at the end of the burst can be used to resolve this modulo-12 ambiguity.

In order to demodulate the payload part of the burst, the absolute timing information instead of the relative timing or modulo-12 timing information is desired. As mentioned above, the marker sequence (M) at the end of the training sequence of FIG. 5 can be used for this task. The marker sequence M is set to be M=−x so that one period of the core training sequence x augmented with M will be orthogonal to two concatenated periods of x, i.e., $[x, M][x,x]^H=0$ in which $x=[x_1, \ldots, x_{12}]$, the core sequence, forms a period of the training sequence.

Since, in the present embodiment, the maximum allowed delay is 60 symbols, a roundtrip delay margin window with a duration of 5 periods of the core sequence is provided. This leaves a duration of 4 periods of the core sequence for the beamformer analysis window. Absolute timing is determined by determining which of the four possible periods of the core sequence is the last one received before the marker sequence. The beamformer analysis window may contain portions of five different core sequences, at least three of which are full periods of the core sequence. The first symbol of the found sequence is either 12, 24, 36 or 48 symbols from the first symbol of the marker sequence. Therefore the absolute timing can be determined by testing only five hypotheses. In other words, given $\tau$, ($0 \leq \tau < 12$), as the modulo-12 delay estimate from the spatial processing search, the possible candidates for the absolute delay are: $\{\tau, \tau+12, \tau+24, \tau+36, \tau+48\}$.

As can be seen from FIG. 5, for any delay less than 60 symbols, the beamformer analysis window at the base station will always contain at least 4 periods of the periodic sequence x. As a result, the first symbol, $x_1$, of the first repetition of the core sequence within the beamforming analysis window can be at most 12 symbols away from the border of the round trip delay margin window and the beamformer analysis window.

Figure 6:
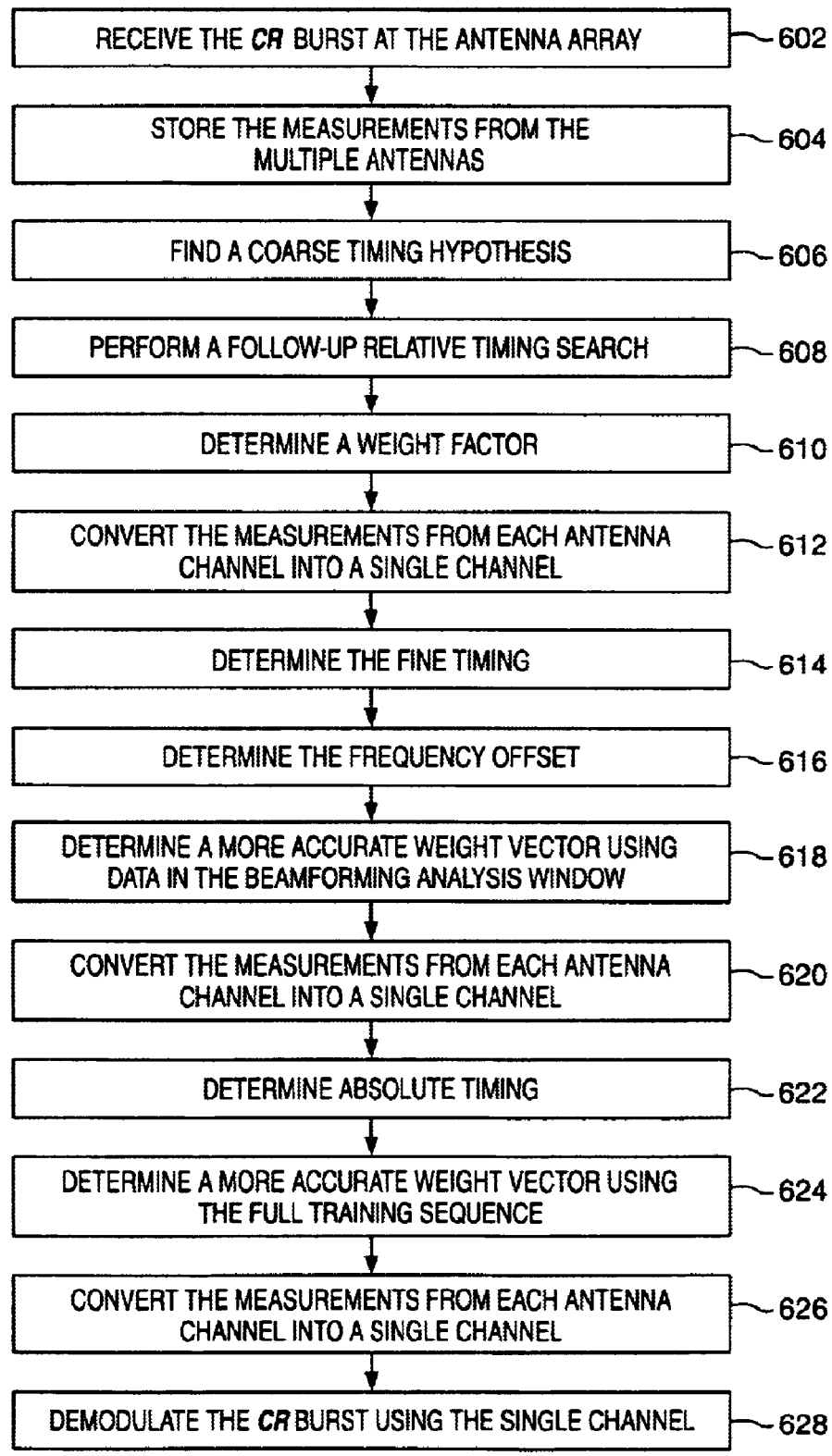
FIG. 6 is a flow chart of an implementation of aspects of the present invention.

This property of the repeating periodic training sequence can be taken advantage of when searching for the first symbol, $x_1$, of the core sequence x. FIG. 6 shows a flow diagram for resolving the CR burst according to one embodiment of the invention. The CR burst is received at the antenna array 602 and the measurements from the multiple antennas for the period that covers the beamformer analysis window are stored 604. Then the beamforming weights that will yield the minimum least squares (LS) error for each timing hypothesis in the search window of 12 symbols is determined. The least squares error results are used to find a coarse relative timing hypothesis 606. Finding this timing includes performing a coarse search for the symbol timing modulo-12 and performing a follow-up search 608.

A weight vector is then determined 610 using the relative timing. This weight vector is applied to the stored measurements to convert the measurements from each antenna channel into a single channel 612. Then, this single channel is analyzed to determine the fine timing 614 and the frequency offset 616 of the desired signal. The fine timing and frequency estimates are used to determine a new more accurate weight vector 618 based on the data in the beamforming analysis window. This improves the quality of the weight vector and the new weight vector is applied to the stored measurements to convert the measurements from each antenna channel into a new single channel 620, further improving the quality of the received signal. The processing so far cannot perfectly determine the timing information, because it can only measure time delays modulo-12 symbols, the duration of the repeating core sequence. The timing estimate is in the range $\{0 \ldots 12\}$, i.e., delays of $\tau$ and $\tau+12$ symbols will ideally produce the same timing estimate at this point. Using the new weight vector, absolute timing is determined by finding the marker sequence 622. This resolves the modulo-12 timing ambiguity.

When the absolute timing is known, the entire training sequence can be identified. Accordingly a new weight vector calculation can be made using the entire training sequence including the marker sequence 624. This redetermined weight vector is still more accurate because of the larger number of samples that can be used. It is applied to the stored measurements to again convert the measurements from each antenna channel into a single channel 626. With the new single channel, the CR burst is demodulated and read 628.

This processing structure yields accurate beamformer weights that can be used to receive the desired signal without determining perfect timing for the signal.

Coarse Search for Relative Timing

After the CR burst has been received in each of the antennas of the array 602 and the signals have been stored 604. The system can proceed to determine the relative timing based on the stored measurements 606. In one embodiment, this process is done using a covariance matrix computation and a Cholesky decomposition.

For measurements that lie in the beamforming analysis window assume that measurements are collected at 1.5 times the symbol rate. In this example, the beamforming analysis window is of duration 48 symbols or 4 repetitions or periods of the core sequence. Next, assume that the variable coreSnapPoint points to the first snapshot that is in the beamformer analysis window, and r(t) denotes the snapshot (measurement vector) collected at time t seconds after the start of the CR burst (relative to base station time). The covariance matrix R can be estimated as follows, where $T_{BAW}$ is the time of the beamforming analysis window:

$$R = \sum_{t \in T_{BAW}} r(t) r^H(t), \quad T_{BAW} = \{t | coreSnapPoint \leq t < coreSnapPoint + 48\}$$

After computing the covariance matrix R, a matrix L can be found such that $$R = L L^H$$

L is termed as the Cholesky factor of R.

In one embodiment, the location of the first symbol of the core training sequence over the first 12 symbols of the beamforming search window is searched for using a least-squares processor with a search step of 2/3 symbols. This results in 18 possible locations of the first symbol, i.e. 18 hypotheses and, accordingly, 18 least-squares (LS) error calculations. The vector coarseSearchGrid contains the delay hypothesis values for each 2/3 symbol increment (The unit used here is a symbol period):

coarseSearchGrid=[0,2/3,4/3,2, . . . ,11 1/3] which contains the delay values for the 18 hypotheses.

For each delay hypothesis k, (1≦k≦18), the following computations are performed:

Calculate cross-correlation vector $p_k$ for each hypothesis:

$$p_k = \sum_{t \in T_{BAW}} r(t) d*(t + \tau_k)$$

In which r(t) is the received signal samples and d(t) is the samples of the desired signal. The desired signal samples are assumed to be available in a filter bank over-sampled at 24 times the symbol rate. The value $\tau_k$ is the assumed delay for the k-th hypothesis, i.e., $\tau_k$=coarseSearchGrid (k).

Back Substitution: The resulting vector $p_k$ is applied to solve for an interim vector $x_k$ for each hypothesis k, where L is the Cholesky factor as mentioned above:

$$L x_k = p_k$$

Then the least-squares (LS) fit for each hypothesis is computed:

$$f_k = f(\tau_k) = \sum_{t \in T_{BAW}} |d(t + \tau_k)|^2 - X_k^H X_k$$

Due to the periodicity of the desired signal within the beamforming analysis window, the cross correlation vector computation can be modified to:

$$p_k = \sum_{t \in T_1} [r(t) + r(t+12) + r(t+24) + r(t+36)] d*(t + \tau_k)$$

in which $T_1$ is a period of the desired signal, i.e., $T_1=\{t | coreSnapPoint \leq t < coreSnapPoint + 12\}$ Therefore, the above calculation of the cross correlation vector $P_k$ costs one-fourth as many multiplies as it would if the core sequence were not a repeated periodic sequence within the training sequence. Finally, the hypothesis with the minimal LS error $f_k$ is picked. An illustration is presented with respect to FIG. 7.

Figure 7:
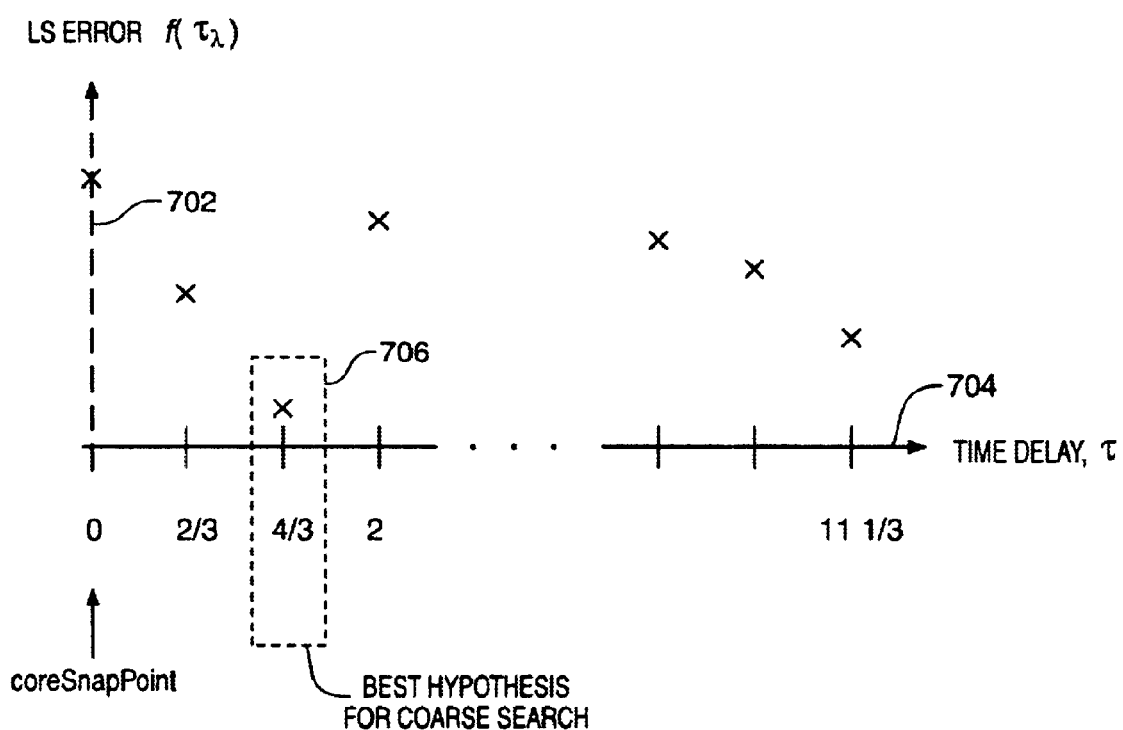
FIG. 7 is a graph of a search for a least squares error relative timing.

FIG. 7 shows the LS cost function on the vertical axis 702 as a function of the time delay τ for the 18 hypotheses on the horizontal axis 704. The horizontal axis is marked in units of 2/3 of a symbol time in accord with the sampling rate of 1.5 times the symbol rate. The selected best coarse search time delay estimate 706 is shown in FIG. 7 at τ=4/3 symbols. Note that the delay is measured with respect to the nominal time or modulo-12 time at which the CR burst is expected to arrive. This nominal time is named the coreSnapPoint. This simplified computation of the cross correlation vectors $p_k$ based on the periodicity of the training sequence within the beamforming analysis window yields substantially the same accuracy as a regular cross correlation computation. Any mismatch of the training sequence in this simplified approach makes only a minimal impact on the performance of the beamformers due to the periodicity of the training sequence.

Follow-up Search

Having made a coarse determination of the relative timing 606 a follow-up timing search 608 can be performed. This search has one more LS error calculation. The result of this calculation can be compared to the best LS error from the coarse search.

The LS error vector $f_k$ from the coarse search is treated as a circular buffer and concentration is on the midpoint of the range between the best location from the coarse search (that yielded the minimum LS error) and its neighbor that yielded the next best LS error.

In the coarse search, the following 20 dimensional vectors were formed:

updatedLSValues=[$f_{18},f_1,f_2,f_3,f_4$, . . . , $f_{17},f_{18}, f_1$]and updatedCoarseSearchGrid=[−2/3,0,2/3,4/3,3 1/3,4, . . . , 11 1/3, 12]

Assume that the hypothesis of $f_3$ (τ=4/3) (of the current list) was selected by the coarse search procedure (as shown in FIG. 5) because $f_3<f_2<f_4$. In the follow-up search procedure, the LS error is computed for τ=1, since this forms the midpoint of the range between the delays corresponding to $f_2$ (τ=2/3) and $f_3$ (τ=4/3). This is shown graphically in FIG. 8.

Figure 8:
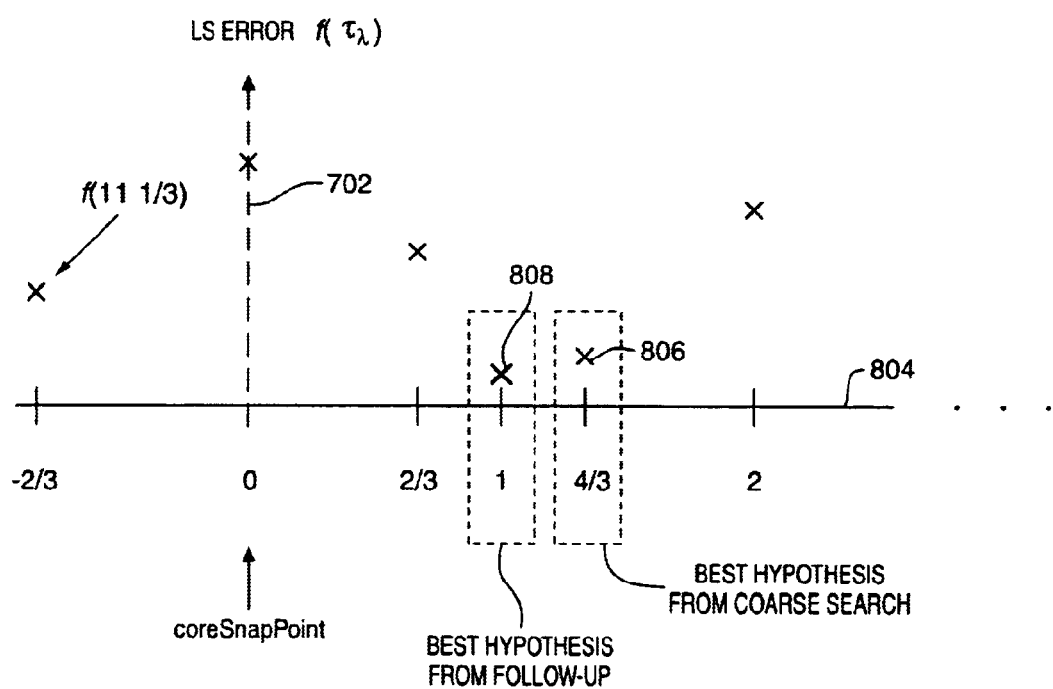
FIG. 8 is a graph of a follow-up search for a least squares error relative timing.

FIG. 8 shows the LS cost function 802 as a function of the 18 hypotheses 804 in which the time domain is again sampled at a rate of 1.5 times the symbol rate. The selected best case coarse search time delay estimate 806 is τ=4/3 symbols. After the additional hypothesis test, the hypothesis (among the 19 of them) which corresponds to the minimum least-squares error is again picked. In this example, $\tau_0$=1 is the delay value 808 that accomplishes this.

Beamforming Weights

After the follow-up search, determining the relative timing delay τ to within one third of a symbol period 608, the weight vector $w_0$ is recomputed to extract the desired signal as follows:

Using the cross-correlation vector $p_0$ for the best hypothesis:

$$p_o = \sum_{t \in T_{BAW}} r(t) d*(t+\tau_o)$$

And the corresponding interim vector $x_0$:

$$Lx_0 = p_0$$

The weights can be computed by solving the following back substitution:

$$L^H w_0 = p_0$$

With the resulting LS error which is already determined to be $f(\tau_0)$:

$$f(\tau_o) = \sum_{t \in T_{BAW}} |d(t+\tau_o)|^2 - x_o^H x_o$$

The beamforming operation results in a single channel measurement that shall be named g(t) and defined as follows:

$$g(t) = w_0^H r(t)$$

The actual computations can be simplified because the time range of the beamforming operation does not need to be the whole burst. Note that the frequency estimation (search) has not yet been performed. This reduces the search to a single dimension, namely time-delay. The frequency search can be avoided because of the duration of the beamforming analysis window, the maximum frequency deviation expected in the received signal and the target SNR level at the output of the beamformer. When the beamformer analysis window is short enough to make the frequency offset negligible, the desired signal mismatch is not significant enough to degrade performance. Furthermore, the inability to improve the SNR even by using an MSE beamformer (that knows the perfect covariance matrix and steering vector) to high levels (above 5 dB) makes the actual beamformer blind to imperfections in the desired signal (such as frequency offset). The presence of frequency offset becomes serious at high target SNRs and ignoring large frequency offsets causes the SNR performance to tend to saturate at around 5 dB output SNR. However, this is still not an issue if the CR burst payload can withstand SNRs as low as 0 dB. Furthermore, the single channel estimation of frequency and fine timing that follows will alleviate these problems using fewer computations.

Fine Timing Estimator

The coarse search and the follow-up search provide a timing delay with an effective rate of three times the symbol rate. The timing resolution can be improved to better demodulate the payload. Severe intersymbol interference can be expected at the worst case timing events (1/6 symbol period of timing error). To estimate fine timing 614, the Oerder-Meyr blind timing estimator can be used. This estimator is blind in the sense that it does not assume any knowledge of the transmitted symbols. Therefore it is insensitive to frequency offset errors. The Oerder-Meyr estimator can be used as follows:

First, interpolate g(t) to 3 times the symbol rate (from 1.5 times the symbol rate) using an interpolation filter, and call the output $g_i(t)$. The duration of the measurements process amounts to 48+12+82=144 symbol periods, this is the guaranteed maximum number of symbols on the right hand side of the coarse timing estimate in the beamforming analysis window as shown in FIG. 5. Alternatively, the symbols can be sampled at a three times rate originally. In such a case, only every other sample would be used in the coarse search and follow-up search.

Next, the interpolated signal is passed through a memoryless nonlinearity to obtain $$g_n(t) = |g_i(t)|.$$

The absolute value nonlinearity generates tones at the multiples of the symbol rate. The nonlinearity is approximated by fitting a polygon. For example, if z is a complex number with representation $z = z_r + j z_i$, then $|z| \approx \max(|z_r|,|z_i|) + 0.34 \times \min(|z_r|,|z_i|)$. The zero-crossing of the complex sine wave at the symbol rate is determined by using a 3 point DFT and this location is termed as a symbol transmission instant. Finally, the symbol transmission instant is found that is closest to the position identified by the follow-up search as the location for the first symbol of the periodic training sequence.

The closed-form estimate obtained using the Oerder-Meyr timing estimator is termed as $\tau_{fine}$. If this estimate is not in the range (0,12), it is mapped into this range by adding or subtracting 12 to it.

Coarse Frequency Estimator

After fine timing is acquired 614, the measurements are used in the analysis window together with the desired signal to compute the cross correlation function and determine the coarse frequency estimate 616 as the peak of the cross correlation function. For simplicity, this analysis is done at the 1.5 times over sampling rate (instead of the 3 times rate used for the fine timing search), however many other sampling rates can be used. Specifically, for the m-th frequency hypothesis, the function freqMatch(m) is computed:

$$freqMatch(m) = \left| \sum_{t \in T_{BAW}} g(t) d*(t+\tau_{fine}) \exp(-j2\pi f_m t) \right|^2$$

The frequency candidate that maximizes freqMatch(m) is selected as the frequency estimate, $f_{coarse}$. Frequency candidates ($f_m$'s) are in the set:

{−2800,−2000,−1200,−400,400,1200,2000,2800}

Alternatively, the frequency uncertainty can be regarded as much less and fewer hypothesis tests can be performed.

More Accurate Beamforming

Using the frequency and timing estimates $\tau_{fine}$, $f_{coarse}$, an improved weight vector, $w_{final}$ can be determined 618 and applied to the found core sequences to obtain an estimate of the desired burst $\hat{s}(t)$:

$$\hat{s}(t) = w_{final}^H r(t)$$

The more accurate weight vector is obtained by employing $d(t+\tau_{fine}) \exp(j2\pi f_{fine} t)$ as the desired signal in the LS error computations. However, if the corresponding LS error is larger than the follow up search based LS error $f_0$, the fine timing and frequency estimates are rejected and the estimates are set to $\tau_{fine} = \tau_0$ and $f_{coarse} = 0$, which results in $w_{final} = w_0$.

To further improve the SNR results at high post-copy SNR levels, the search can be performed for a fine frequency estimate around the coarse frequency estimate at locations $f_{coarse}+[-800,0,800]$ using an LS fit to multichannel measurements for $t \in T_{BAW}$. Such a search can be included to improve the frequency estimation performance for the CR burst demodulator.

Absolute Timing Recovery

Prior to determining the absolute timing, as opposed to relative timing, the more accurate weight vector is applied in order to convert the measurements stored from each of the antennas into a single channel measurement 620. This conversion is still done using the data in the beamforming analysis window because only this data is certain to consist only of periods of the core sequence. An appropriate procedure 622 for determining the absolute delay can be implemented as follows. Assume that the modulo-12 time-delay estimate is $\tau$, and that g(t) denotes the output of a beamformer (as described above g(t) is a single channel measurement) that extracts the desired CR burst. First, the candidate starting locations for the concatenated sequence [P9,M] (see FIG. 5) for each of the five delay hypotheses is determined. For example, if the absolute delay equals $\tau$, the sequence [P9,M] should start $\tau+36$ symbols away from the left border of the beamformer analysis window. For the hypothesis in which the absolute delay is assumed to be equal to $\tau+48$, the sequence [P9,M] should start $\tau$ 84 symbols away from the left border of the analysis window.

More specifically, assume that $T_k$ denotes the begin time for the k-th hypothesis, i.e., $T_k=\tau+36+(12 \times k)$, for k=0,1,2,3,4. Let $v_k$ denote the samples of g(t) that correspond to the interval which starts at $T_k$ for a duration of 24 symbols (two periods). For each hypothesis, compute:

$$h(k)=|v_k[x,-x]^H|^2.$$

Pick the hypothesis that yields the maximum h(k).

Assume that hypothesis $k_0$ is selected. Then, the absolute timing estimate is determined as $\tau+(k_0 \times 12)$.

Due to the orthogonal nature of [x, m] and [x, x], there is a five-ary pulse-position modulation (PPM) demodulation problem in which the SNR changes depending on the true position of the desired vector [x, m]. For example, if the actual delay is less than a period, then the payload portion of the desired CR burst will appear as noise for the hypothesis tests 1,2,3,4. On the other hand, if the actual delay is, for example 20 symbols, then, the CR burst payload symbols will not contribute to the test of a hypothesis in which k=0 as noise because of the orthogonality of [x, m] and [x, x], but they will contribute to the noise component in h(k) for k=2,3,4. With this delay condition, the beamforming analysis window receives the following 48 symbols:

$x_5,x_6,x_7,x_8,x_9,x_{10},x_{11},x_{12},x_1,x_2,x_3,x_4, \ldots x_5,x_6,x_7,x_8,x_9,$
$x_{10},x_{11},x_{12},x_1,x_2,x_3,x_4,$ In this stream, the first and last 12 symbols are written out. The spatial processing search will discover the first occurrence of $x_1$ at a delay of 8 symbols. The next step is to determine whether the absolute delay is 8,20,32,44,56 symbols. In order to determine this, the measurements following the beamforming analysis window are focused upon. With a delay of 20 symbols, the next 40 symbols will be:

$x_5,x_6,x_7,x_8,x_9,x_{10},x_{11},x_{12},x_1,x_2,x_3,x_4,x_5,x_6,x_7,x_8,x_9,x_{10},$
$x_{11},x_{12},-x_1,-x_2,-x_3,-x_4, -x_5,-x_6,-x_7,-x_8,-x_9,-x_{10},-$
$x_{11},-x_{12},d_1,d_2,d_3,d_4,d_5,d_6,d_7,d_8,$ in which $d_i$ indicates the i-th payload symbol, which is unknown. As a result, $v_0=[x, x]$ and $v_1=[x, -x]$, which results in $h(0)=0$ and $h(1)=24^2$. Accordingly, the desired signal does not contribute to the decision variable h(0) when the absolute delay is larger than 12. On the other hand, $v_2=[-x_1,-x_2,$ $\ldots,-x_{12}, d_1,d_2, \ldots d_{12}]$ is not necessarily equal to zero. The first half of $v_2$ equals the marker sequence, which yields the result:

$$h(2)=|-12-[d_1,d_2, \ldots d_{12}] x^H|^2.$$

This differs significantly from:

$$h(3)=|[d_1,d_2, \ldots d_{12}] x^H-[d_{13},d_{14}, \ldots, d_{24}] x^H|^2.$$

h(2) is expected to be higher than h(3) on average because of the coherence term (−12) inside the magnitude operator and its presence creates a significant competition to the correct hypothesis decision value (h(0)) in the presence of measurement noise. Therefore, absolute delay errors that are equal to +12 should dominate other values of delay estimation errors. One way to eliminate the self-noise problem is to put the marker sequence in the beginning of the burst and search for the concatenated sequence [−x, x]. In such a design, self noise will exist only due to the presence of the ramp-up symbols, but this will affect the noise component in only one of the h(k)'s. Other modifications to the ordering of the sequences are also possible to suit particular applications.

As discussed above, the remaining task is to find the marker sequence. This can be done based on a cross correlation operation with the 1.5 times over-sampled version of the sequence [x,−x] with $v_k$ corresponding to all of the five hypotheses locations indicating period slips of 0,1,2,3,4.

Using the fine timing estimate $\tau_{fine}$, the time of the final beamformer output sample (that arrives at $t_c$) which is closest to coreSnapPoint+$\tau_{fine}$ is determined. Let $\tau_e$ denote the time difference between the chosen measurement at $t_c$ and the location of actual timing location:

$$\tau_e=t_c\text{-coreSnapPoint-}\tau_{fine}$$

Remember that the beginning of the k-th hypothesis (k=0,1,2,3,4) will be at times $T_k$=coreSnapPoint+$\tau_{fine}$. Therefore, the vector $v_k$ to be tested for the cross correlation for the k-th hypothesis will take the form:

$$v_k=[\hat{s}(t_c+12\times(3+k)), \hat{s}(t_c+12\times(3+k)+2/3)], \hat{s}(t_c+12\times(3+k)+2\times2/3), \ldots, \hat{s}(t_c+12\times(3+k)+35\times2/3)$$

which is a vector with 36 entries.

The $v_k$'s are cross correlated with the desired signal vector d, which is formed from the knowledge of the training waveform and the timing difference $\tau_e$:

$$d=[s_d(\text{coreSnapPoint}+\tau_e+12\times3), s_d(\text{coreSnapPoint}+\tau_e+12\times3+2/3), \ldots, s_d(\text{coreSnapPoint}+\tau_e+12\times3+35\times2/3)]$$

in which $s_d(t)$ is the training waveform for the desired signal.

The magnitude squared cross correlations for each hypothesis is computed:

$$h(k)=|v_k d^H|^2$$

Let $k_0$ denote the index of the largest h(k). Then, the absolute timing is determined as:

$$\tau_{abs}=\tau_{fine}+(k_0\times12)$$

The values are in terms of symbol durations in the above equation with the period of the training sequence being 12 symbols.

Alternatively, symbol spaced sampling can be used in the absolute timing recovery. This can eliminate the mismatches created in the 1.5 times measurements that result in loss of orthogonality. With symbol spaced sampling, this operation will require 5 cross correlations of length 24 and comparing the squared-magnitudes of the cross correlations.

After absolute timing recovery 622, the whole training sequence can be used to improve the timing and frequency estimates and these estimates can be used to perform one more stage of beamforming over the whole training sequence duration. This can increase the number of symbols used in spatial processing to 120 symbols from 48 and improve the performance at a cost of computational complexity The beamforming would involve first determining a still more accurate weight vector using the full training sequence 626 and then applying this weight vector to convert the measurements stored for each antenna channel into a single channel measurement 628. In doing so a new covariance matrix should be computed and therefore another Cholesky factorization performed. The conversion can be applied to the entire CR burst so that the CR burst can be demodulated as a single channel 628. Alternatively, the absolute timing can be applied to determine the beginning and end of the CR burst and the existing weight vector and frequency estimates can be used to demodulate the signal. The choice will depend on the demands of the particular system and the condition of the channel. Having determined timing and a weight vector, this weight vector can be used to send traffic back to the remote from which the CR burst was received 630.

General Matters

The present invention can eliminate the need to acquire the absolute timing information in order to perform beamforming. It exploits the periodicity of target training sequences in order to estimate the time delay encountered by the desired signal modulo-the period of the training sequence which is less than the total time delay ambiguity range. The reception of uplink messages at the base station which are not perfectly synchronized is enhanced.

Training based interference cancellation methods can be used to enhance the signal quality for such bursts. However, the training sequence should be aligned with the incoming signal, and therefore the resulting search process involves testing every possible delay with a predetermined resolution. As the delay ambiguity grows, this hypothesis testing process becomes increasingly more expensive with computational resources.

Using a periodic training sequence eases the efforts of hypothesis testing followed by a timing acquisition sequence to determine the perfect timing information. The periodic sequence decreases the timing ambiguity to within a period of the training sequence, which can be selected small so that resources are available to handle the hypothesis testing task. For example, if the expected delay is 50 symbols, and if the period of the training sequence is 10 symbols, with a resolution of a symbol, 10 hypotheses can be tested instead of 50, provided that the periodic training sequence can be observed in the search window, regardless of the delay. In addition, the search operation, which involves cross correlations can be simplified by the number of periods in the search window, if the search window contains 5 periods of the training sequence (period with 10), the cross correlations can be simplified by five-fold.

Once the timing hypothesis is verified, only the number of periods of the repeating core sequence that has been skipped must be determined. To perform this more accurately, the multiple channel measurements (if available) can be converted to a single channel measurement using the search procedure results outlined above. After that a timing acquisition sequence that is at the beginning of the burst can be found, and to find the number of periods that were missed. So in the previous example, only periods {0,1,2,3,4} may have been missed in the beamforming analysis window. Accordingly, 5 searches can be performed and these are performed on single channel measurements rather than multichannel measurements.

The invention eliminates the high cost of search on possibly multichannel data for all possible delays that may be encountered by the user terminal as a function of range. The burst structure and periodic training sequence makes it easier to search for the arrival time of the signal and the periodicity of the training further reduces the cost of computations.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various steps. The steps of the present invention may be performed by hardware components, such as those shown in FIGS. 1 and 2, or may be embodied in machine-executable instructions, which may be used to cause a general-purpose or special-purpose processor or logic circuits programmed with the instructions to perform the steps. Alternatively, the steps may be performed by a combination of hardware and software. The steps have been described as being performed by either the base station or the user terminal. However, any steps described as being performed by the base station may be performed by the user terminal and vice versa. The invention is equally applicable to systems in which terminals communicate with each other without either one being designated as a base station, a user terminal, a remote terminal or a subscriber station.

The present invention may be provided as a computer program product which may include a machine-readable medium having stored thereon instructions which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/ machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

Importantly, while the present invention has been described in the context of a wireless Internet data system for portable handsets, it can be applied to a wide variety of different wireless systems in which data are exchanged. Such systems include voice, video, music, broadcast and other types of data systems without external connections. The present invention can be applied to fixed remote terminals as well as to low and high mobility terminals. Many of the methods are described in their most basic form but steps can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the present invention is not to be determined by the specific examples provided above but only by the claims below.

What is claimed is:

1. A method comprising:
   receiving a downlink broadcast burst from a base station;
   determining timing for an uplink burst from the received broadcast burst, the unlink burst including a training sequence;
   selecting an amount of delay for the uplink burst, the delay having a duration shorter than the training sequence; and
   transmitting an uplink burst with the training sequence to the base station using the determined timing and the selected amount of delay.

2. The method of claim 1 wherein selecting an amount of delay comprises selecting a random amount of delay.

3. The method of claim 2 wherein randomly selecting comprises generating a random number and applying the random number to select a random amount of delay.

4. The method of claim 1 wherein selecting an amount of delay comprises determining a digit from an identification number of the user terminal and applying the determined digit to selecting from among a set of different amounts of delay.

5. The method of claim 1 wherein determining timing comprises determining nominal timing relative to a frame of the broadcast burst.

6. The method of claim 1 wherein determining timing comprises determining timing on a broadcast channel on which the broadcast burst was received.

7. The method of claim 1 further comprising:
   receiving a timing advance message from the base station in response to the uplink burst; and
   advancing timing in accordance with the timing advance message reduced by the selected amount of delay.

8. The method of claim 1 wherein the bursts comprise symbols and wherein the selected amount of delay is between zero and nine symbol times.

9. The method of claim 1 wherein the bursts comprise symbols, wherein the training sequence comprises a repeating core sequence and wherein the selected amount of delay corresponds to a symbol time shorter than the symbol time of the core sequence.

10. A machine-readable medium having stored thereon data representing sequences of instructions which, when executed by a machine, cause the machine to perform operations comprising:
    receiving a downlink broadcast burst from a base station;
    determining timing for an uplink burst from the received broadcast burst, the uplink burst including a training sequence;
    selecting an amount of delay for the uplink burst, the delay having a duration shorter than the training sequence; and
    transmitting an uplink burst with the training sequence to the base station using the determined timing and the selected amount of delay.

11. The medium of claim 10 wherein the instructions causing the machine to perform operations comprising selecting an amount of delay further comprise instructions for selecting a random amount of delay.

12. The medium of claim 11 wherein the instructions causing the machine to perform operations comprising randomly selecting further comprise instructions for generating a random number and applying the random number to select a random amount of delay.

13. The medium of claim 10 wherein the instructions causing the machine to perform operations comprising selecting an amount of delay further comprise instructions for determining a digit from an identification number of the user terminal and applying the determined digit to selecting from among a set of different amounts of delay.

14. The medium of claim 10 wherein the instructions causing the machines to perform operations comprising determining timing further comprise instructions for determining timing on a broadcast channel on which the broadcast burst was received.

15. The medium of claim 10 wherein the instructions further comprise instructions causing the machine to perform operations comprising:
    receiving a timing advance message from the base station in response to the uplink burst; and
    advancing timing in accordance with the timing advance message reduced by the selected amount of delay.

16. The medium of claim 15 wherein the bursts comprise symbols, wherein transmitting the uplink burst comprises transmitting the uplink burst with a training sequence, wherein the training sequence comprises a repeating core sequence and wherein the selected amount of delay corresponds to a symbol time shorter than the symbol time of the core sequence.

17. An apparatus comprising:
    a receiver to receive a downlink broadcast burst from a base station;
    a processor to determine timing for an uplink burst including a training sequence from the received broadcast burst and select an amount of delay for the uplink burst, the delay having a duration shorter than the training sequence; and
    a transmitter to transmit the uplink burst including the training sequence to the base station using the determined timing and the selected amount of delay.

18. The apparatus of claim 17 wherein the processor selects an amount of delay by selecting a random amount of delay.

19. The apparatus of claim 18 wherein the processor selects a random amount of delay by generating a random number and applying the random number to select a random amount of delay.

20. The apparatus of claim 17 further comprising a register containing an identification number of the apparatus and wherein the processor select an amount of by determining a digit from the register and applying the determined digit to selecting from among a set of different amounts of delay.

21. The apparatus of claim 17 wherein:
    the receiver receives a timing advance message from the base station in response to the uplink burst; and
    the processor advances timing in accordance with the tinting advance message reduced by the selected amount of delay.

22. The apparatus of claim 17 wherein the bursts comprise symbols, wherein transmitting the uplink burst comprises transmitting the uplink burst with a training sequence, wherein the training sequence comprises a repeating core sequence and wherein the selected amount of delay corresponds to a symbol time shorter than the symbol time of the core sequence.

* * * * *